US007266836B2

(12) United States Patent
Anttila et al.

(10) Patent No.: US 7,266,836 B2
(45) Date of Patent: Sep. 4, 2007

(54) TUNE ALERTS FOR REMOTELY ADJUSTING A TUNER

(75) Inventors: Akseli Anttila, Helsinki (FI); Younghee Jung, Helsinki (FI)

(73) Assignee: Nokia Corporation, Espoo (FI)

( * ) Notice: Subject to any disclaimer, the term of this patent is extended or adjusted under 35 U.S.C. 154(b) by 60 days.

(21) Appl. No.: 10/066,631

(22) Filed: Feb. 4, 2002

(65) Prior Publication Data

US 2003/0149990 A1 Aug. 7, 2003

(51) Int. Cl.
*H04N 7/173* (2006.01)
*H04H 7/00* (2006.01)
*H04M 3/00* (2006.01)
*H04B 7/00* (2006.01)

(52) U.S. Cl. .................. 725/133; 725/67; 725/109; 725/120; 455/3.06; 455/420; 455/519

(58) Field of Classification Search .................. 455/88, 455/550.1, 567, 566, 556, 3.04, 3.05, 3.06, 455/161.1, 186.1, 418, 419, 420, 518, 519; 725/105, 133, 141, 62, 67, 108, 109, 120; 340/7.21, 7.22, 7.23, 7.39, 7.41, 7.42, 7.48, 340/7.58

See application file for complete search history.

(56) References Cited

U.S. PATENT DOCUMENTS

| 5,475,835 | A | | 12/1995 | Hickey |
| 5,812,937 | A | | 9/1998 | Takahisa et al. |
| 5,930,700 | A | * | 7/1999 | Pepper et al. |
| 6,163,711 | A | | 12/2000 | Juntunen et al. |
| 6,381,465 | B1 | * | 4/2002 | Chern et al. |
| 6,778,834 | B2 | * | 8/2004 | Laitinen et al. ............. 455/450 |
| 6,834,195 | B2 | * | 12/2004 | Brandenberg et al. ... 455/456.3 |
| 6,915,528 | B1 | * | 7/2005 | McKenna, Jr. ............... 725/37 |
| 6,968,179 | B1 | * | 11/2005 | De Vries .................. 455/414.1 |
| 7,006,613 | B2 | * | 2/2006 | Novak et al. .......... 379/142.01 |
| 2001/0030664 | A1 | * | 10/2001 | Shulman et al. |
| 2002/0056123 | A1 | * | 5/2002 | Liwerant et al. ............. 725/87 |
| 2002/0124252 | A1 | * | 9/2002 | Schaefer et al. |
| 2002/0199183 | A1 | * | 12/2002 | Tanighuchi |
| 2003/0028884 | A1 | * | 2/2003 | Swart et al. |
| 2003/0040293 | A1 | * | 2/2003 | Fish et al. |
| 2003/0061611 | A1 | * | 3/2003 | Pendakur |
| 2003/0093789 | A1 | * | 5/2003 | Zimmerman et al. |
| 2003/0110503 | A1 | * | 6/2003 | Perkes .......................... 725/86 |
| 2004/0237109 | A1 | * | 11/2004 | Laitinen et al. ............... 725/62 |

FOREIGN PATENT DOCUMENTS

| WO | 99/20026 A | 4/1999 |
| WO | 00/13415 A2 | 3/2000 |
| WO | WO 01/47269 A1 | 6/2001 |
| WO | 01/50309 A | 7/2001 |

OTHER PUBLICATIONS

PCT International Search Report mailed Aug. 18, 2003, (PCT/IB03/00326).

* cited by examiner

*Primary Examiner*—Kieu-Oanh Bui
(74) *Attorney, Agent, or Firm*—Banner & Witcoff, Ltd.

(57) ABSTRACT

Methods and systems are provided for alerting users of audio and/or video broadcasts. A user of a first media player may create a tune alert message and transmit the message to a second media player. The second media player may parse or decipher the message and reconfigure a tuner module to receive and process the identified content.

32 Claims, 6 Drawing Sheets

TUNE ALERTS FOR REMOTELY ADJUSTING A TUNER

BACKGROUND OF THE INVENTION

1. Field of the Invention

The invention relates to selecting content with a media player. More particularly, the invention relates to systems and methods for sending messages to adjust tuners on remote media players.

2. Description of Related Art

Consumer electronic devices allow users to enjoy an ever-increasing amount of broadcast content. Broadcast content includes radio content, television content, streaming audio and video content and other content that may be processed by a media player. Users of media players often wish to alert other users of broadcast content that they enjoy or find interesting. For example, a person listening to a particular radio broadcast may hear content that the person thinks that his or her friend may be interested in receiving or a person viewing a digital video broadcast may wish to alert coworkers of a work related broadcast. People also enjoy discussing broadcasts with others who have also viewed or listened to the same broadcast.

A conventional approach to alerting users of media players to broadcasts is for a first user to utilize a telephone device to call and describe the broadcast to a second user. One drawback of this approach is that it is burdensome to the first user and may cause the first user to miss part of the broadcast while describing the broadcast to the second user. Moreover, while wanting to alert the second user, the first user may not want to initiate a conversation that may move on to other topics.

As a result, there is a need in the art for systems and methods that allow users of media players to alert other users of broadcasts in an efficient and timely manner.

BRIEF SUMMARY OF THE INVENTION

One or more of the above above-mentioned needs in the art are satisfied by the disclosed systems and methods for sending and processing tune alert messages. The messages may be sent directly from a media player while observing broadcast content and may be formatted to automatically adjust the configuration of another media player. The disclosed tune alert messages may be quickly formatted and transmitted to minimize interruptions to users observing broadcast content.

In a first embodiment of the invention, a method of transmitting a tune alert message from a first media player to a second media player is provided. First, broadcast content is presented to a user of the first media player. A tune alert message formatted to reconfigure the second media player to provide the content to a user of the second media player is generated at the first media player. The tune alert message is then transmitted from the first media player.

In another embodiment of the invention, a method of adjusting a configuration of a media player to receive broadcast content is provided. First, the media player receives a tune alert message formatted to reconfigure the media player to provide the broadcast content to a user of the media player. The tune alert message is then presented to a user of the media player. Finally, the media player is reconfigured to process the broadcast content.

In yet another embodiment of the invention, a media player configured to receive messages and programming content is provided. The media player includes a message module that receives a message transmitted to the media player and identifying a source of broadcast content. A tuner that is adjustable is provided to process content received from a plurality of different sources of broadcast content. The media player also includes a tune alert module configured to adjust the tuner to process content received from the content source identified in the message.

In other embodiments of the invention, computer-executable instructions or control logic for implementing the disclosed methods are stored on computer-readable media or implemented with hardware modules.

Other features and advantages of the invention will become apparent with reference to the following detailed description and the figures.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
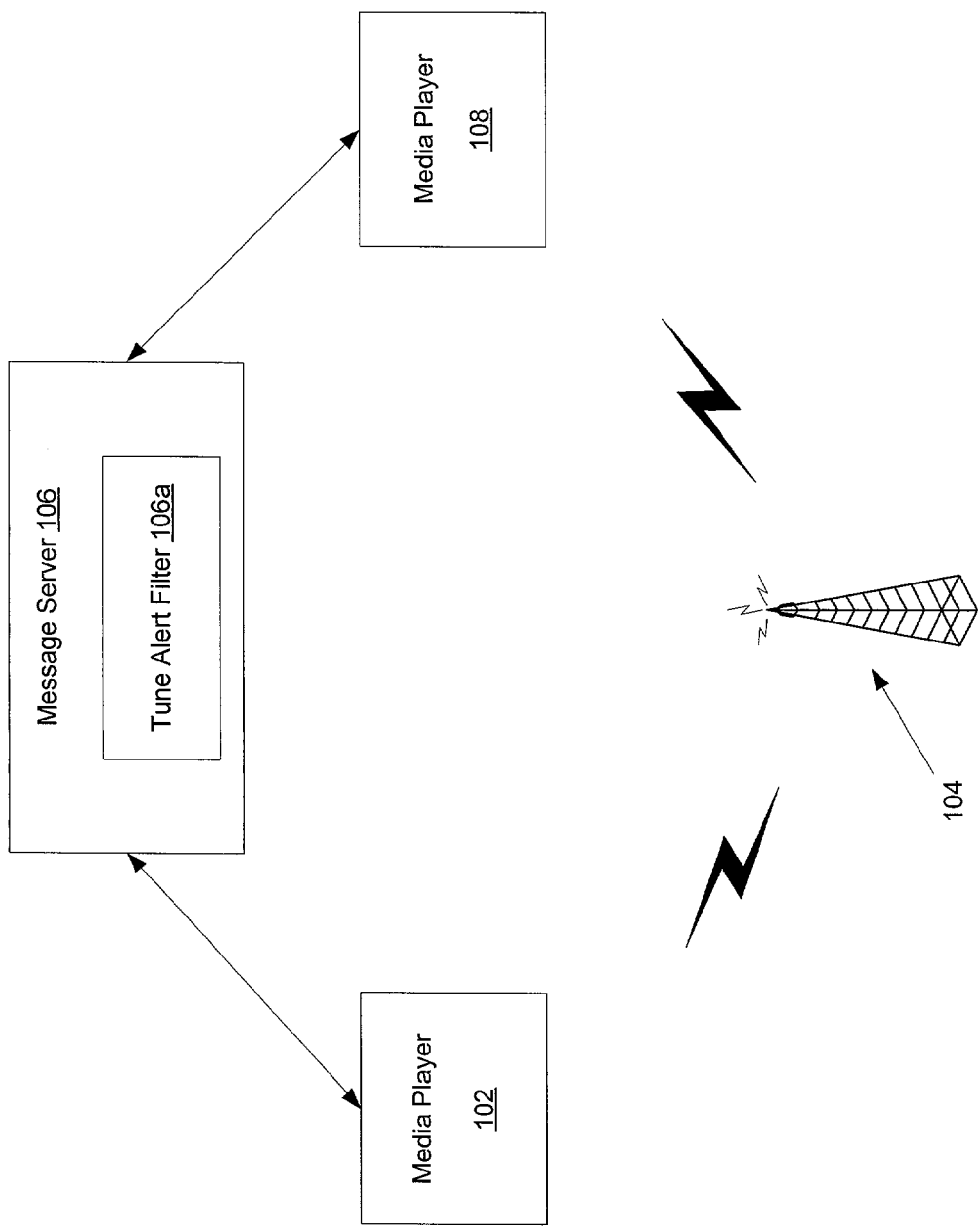
FIG. 1 shows a system for viewing broadcast content and transmitting tune alert messages between media players, in accordance with an embodiment of the invention.

FIG. 1 illustrates a system for viewing broadcast content and transmitting tune alert messages between media players in accordance with an embodiment of the invention. A media player 102 receives content broadcasted by a broadcast source 104. As used herein, a media player is not limited to a particular software implementation and may be implemented with a hand-held wireless device, a set-top box coupled to a television or monitor, a computer device, or any other electronic component that presents audio and/or visual content to a user and transmits messages to other media players. Media player 102 may also be implemented with a mobile telephone device, such as a Nokia Mobile Communicator. While observing content broadcasted by broadcast source 104, media player 102 may transmit a tune alert message to message server 106. Message server 106 may relay messages between media players 102 and 108. In addition, a tune alert filter module 106a may be included to filter messages before they are transmitted to media players. The filtering of tune alert messages will be apparent from the description provided below.

In operation, while listening to a radio broadcast, media player 102 may transmit a tune alert message to media player 108 via message server 106. The tune alert message may be formatted to automatically tune media player 108 to the broadcast identified in the tune alert message. Media players 102 and 108 may be implemented with different devices that operate with different protocols or formats. In one aspect of the invention, message server 106 stores information relating to the formats and protocols used by each of the media players. After receiving a message from a first media player, message server 106 may reformat the message, when necessary, before transmitting the message to a second media player.

Figure 2:
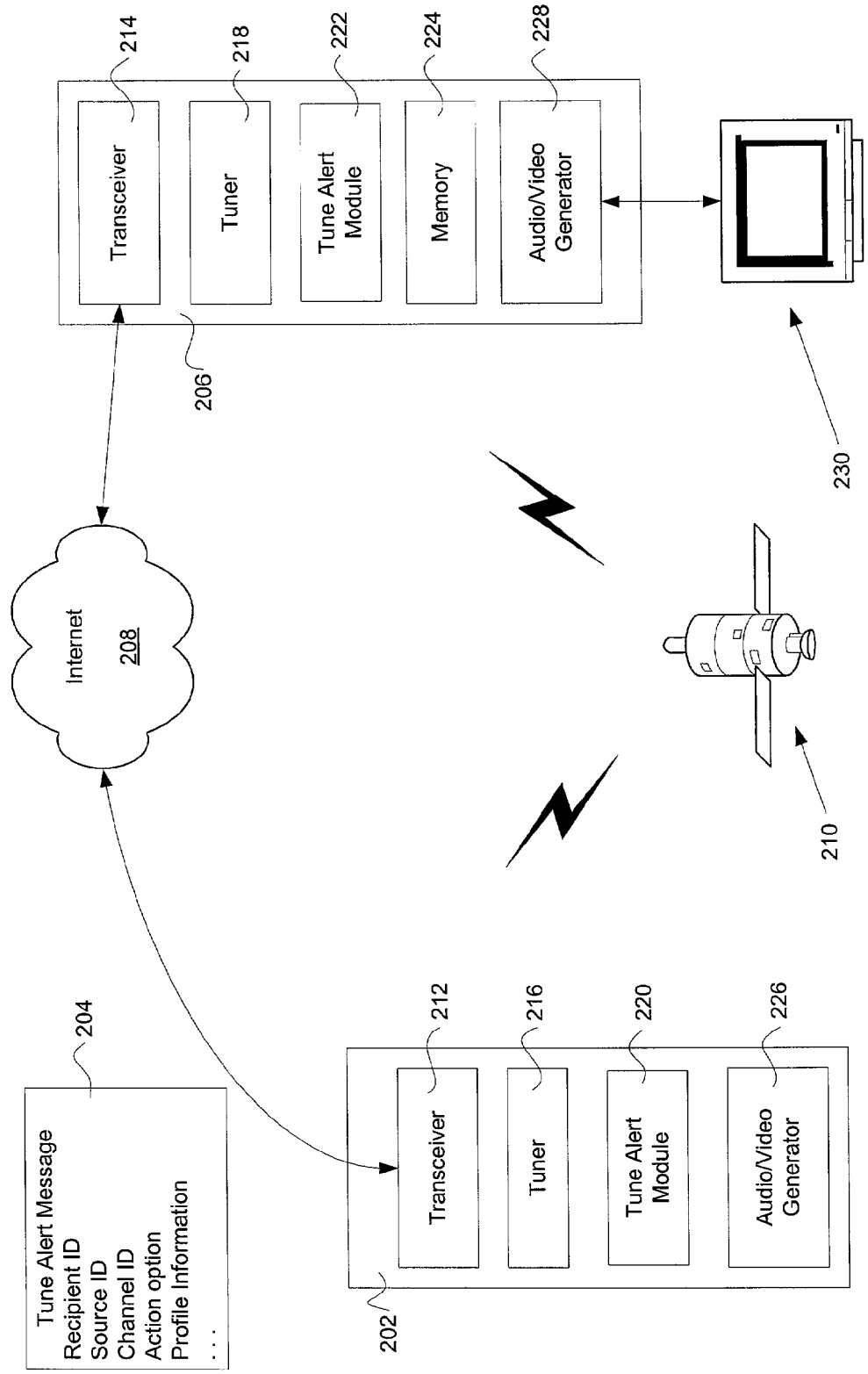
FIG. 2 shows an embodiment in which a media player transmits a tune alert message directly to another media player, in accordance with an embodiment of the invention.

FIG. 2 illustrates an embodiment in which a first media player 202 transmits a tune alert message 204 to another media player 206. FIG. 2 shows an embodiment in which the transmission path between media players includes the Internet 208. Media players 202 and 206 receive digital video broadcasted from a satellite 210. Media players 202 and 206 include transceiver modules 212 and 214 for sending and receiving messages. In one aspect of the invention, transceiver modules 212 and 214 are implemented with conventional modem units for sending content across the Internet 208. In an alternative embodiment, media players 202 and 206 may communicate directly using Bluetooth, IrDa or other known protocols or components that allow for communications without an external network or server.

Each media player may also include a tuner module 216 and 218 for selecting broadcast content. One skilled in the art will appreciate that tuner modules 216 and 218 may be implemented with a variety of different content selection devices that are chosen based on the particular application. For example, tuner modules 216 and 218 may be implemented with frequency selection devices or modules used to select a particular transmission stream or packet identifier from digital video broadcast.

Tune alert modules 220 and 222 may be included to format and process tune alert messages. Tune alert module 220 may format tune alert message 204 to include the information shown in FIG. 2 in a manner that can be processed or deciphered by media player 206. Tune alert message 204 may be formatted in accordance with message platforms that include, but are not limited to SMS, Bluetooth, XML and MMS (Multimedia Messaging System). Tune alert module 222 may include hardware and/or software components for the processing of tune alert messages and, when appropriate, adjusting the configuration of tuner 218. Media player 206 may also include a memory 224. Memory 224 may be used to store tune alert messages, preference parameters or other information and may be used by media player 206. Media player 202 may also include a similar memory.

Media player 202 and 206 may also include audio/video generators 226 and 228 for creating audio and/or video signals that may be presented to users. For example, audio/video generator 228 may create an NTSC signal that may be used by a conventional television 230. Of course, one or both of media player 202 and 206 may also include speakers, a microphone, a display screen or any other component used to present audio and/or video content. Moreover, media player 202 and 206 may also include a variety of additional components that are unrelated to the transmission and reception of tune alert messages, such as telephone components and any additional components and modules conventionally associated with personal digital assistants, digital video processing devices and wireless devices.

Figure 3:
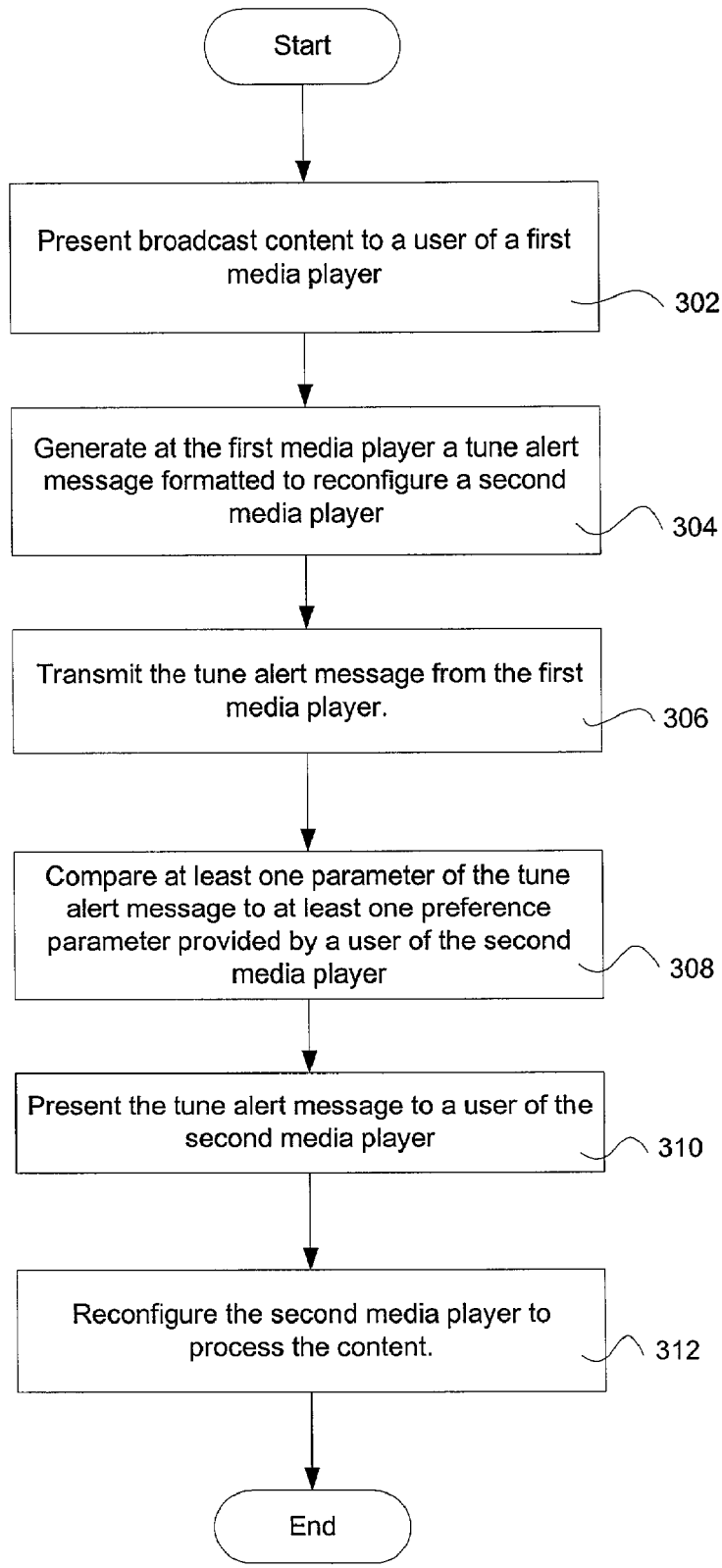
FIG. 3 illustrates a method of sending, receiving and processing tune alert messages, in accordance with an embodiment of the invention.

FIG. 3 illustrates a method for sending, receiving and processing tune alert messages in accordance with an embodiment of the invention. First, in step 302, broadcast content is presented to a user of a first media player. Step 302 may include displaying a television broadcast, presenting multimedia content, generating sound from a radio broadcast or any other form of presenting broadcast content. Content may also be in the form of promotional content or advertisements. In one aspect of the invention, promotional content is selected and transmitted to media players based, at least in part, on the locations of the media players. Location information may be determined by a GPS receiver, may be based on the location of a current cell or may be determined by other means. In one embodiment, a user manually enters location information, which may be stored in a profile. Next, in step 304 the first media player generates a tune alert message formatted to reconfigure the second media player.

Figure 4:
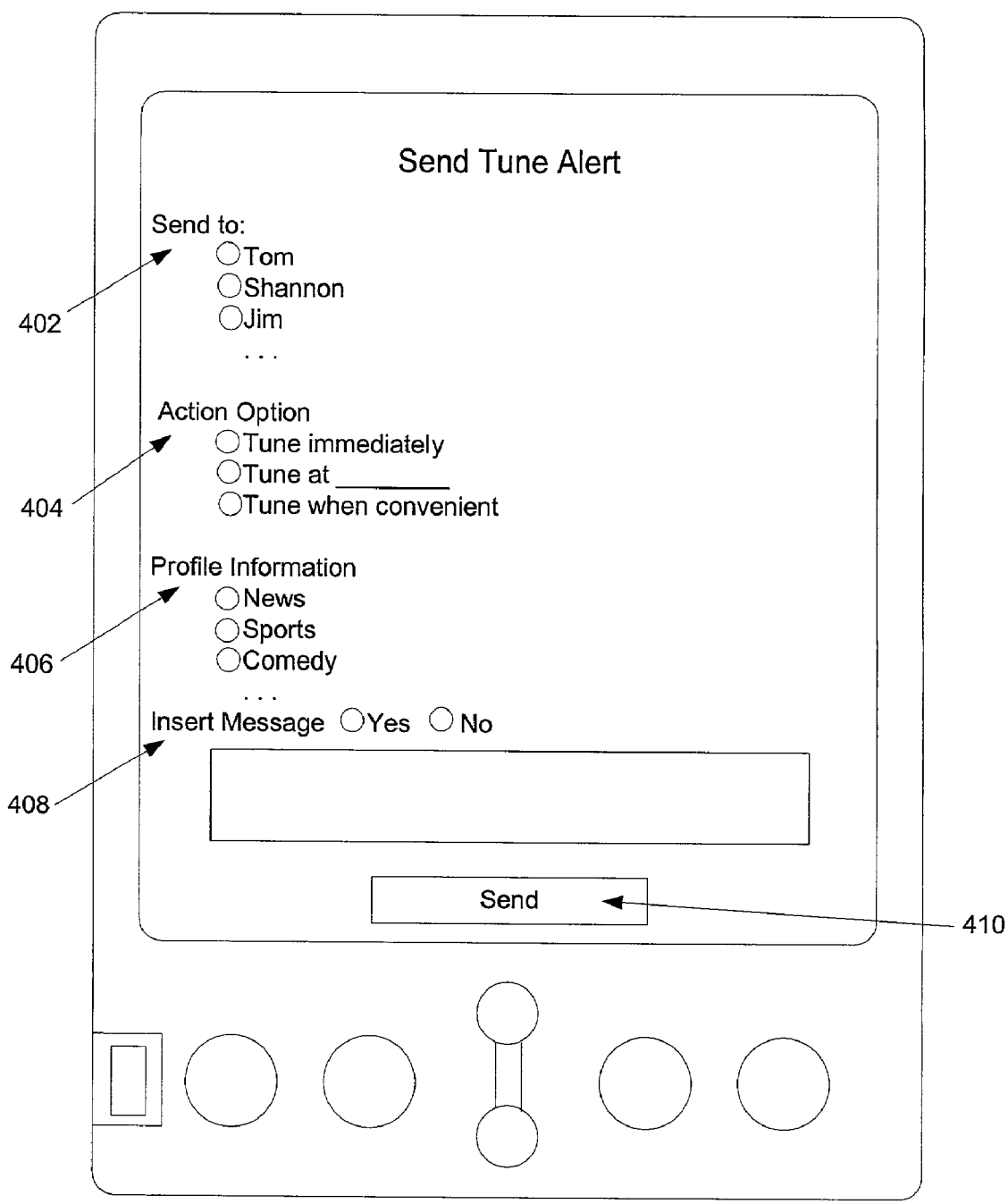
FIG. 4 shows a user interface screen used to send tune alert messages, in accordance with an embodiment of the invention.

FIG. 4 illustrates a user interface screen that may be used to send a tune alert message. A "Send To" field 402 may contain a list of users known to the first user. Each of the listed users may have a corresponding recipient ID, such as an Internet protocol (IP) address or telephone number. The first user may select one of the individuals listed or, alternatively, address the tune alert message to a user not listed in field 402. Next, an "Action Option" field 404 identifies an urgency of the tune alert message. In particular, the sender can request that the recipient of the tune alert message tune to the broadcast immediately, at a predetermined time, when convenient or at any other time identified by the sender of the tune alert message.

The sender of the tune alert message may also include profile information characterizing the content in a "Profile Information" field 406. Of course, there exists a variety of different types of information that may be included within profile information. In one embodiment, the profile information is compared to preference information in another mobile terminal. The sender of the tune alert message may also elect to insert a message by making the appropriate selection and then entering the appropriate information in an "Insert Message" field 408.

Returning to FIG. 3, in step 306, the tune alert message is transmitted from the first media player. In one embodiment, step 306 may be performed after a user sending the message selects a send button 410 (shown in FIG. 4). In step 308, at least one parameter of the tune alert message is compared to at least one preference parameter provided by a user of the second media player. Step 308 may be performed at a media player. Alternatively, step 308 may be performed at a message server to limit the number of messages transmitted to a media player.

Figure 5:
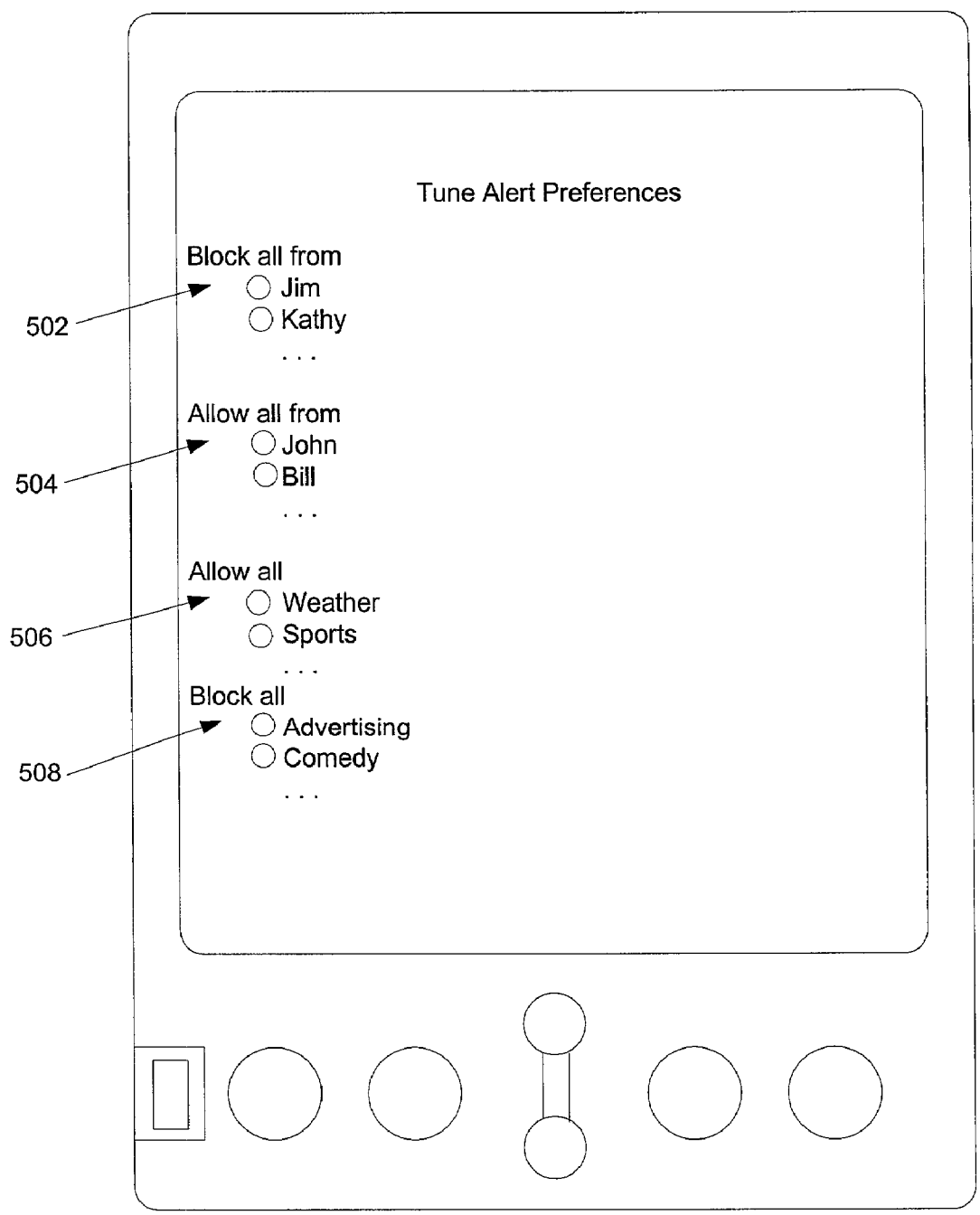
FIG. 5 shows a user interface screen used to select user preferences, in accordance with an embodiment of the invention.

FIG. 5 illustrates a user interface screen that may be used to provide preference information. A "Block All From" field 502 allows the user to identify other users from whom the user does not desire to receive tune alert messages. An "Allow All From" field 504 allows the user to identify other users from whom all tune alert messages will be processed. One skilled in the art will appreciate that there are numerous preference options they can be used to block or filter tune alert messages. For example, an "Allow All" field 506 and a "Block All" field 508 may be used to provide preferences for filtering messages based on one or more characteristics of the content identified in the messages.

Returning once again to FIG. 3, in step 310 the tune alert message is presented to a user of the second media player.

Figure 6:
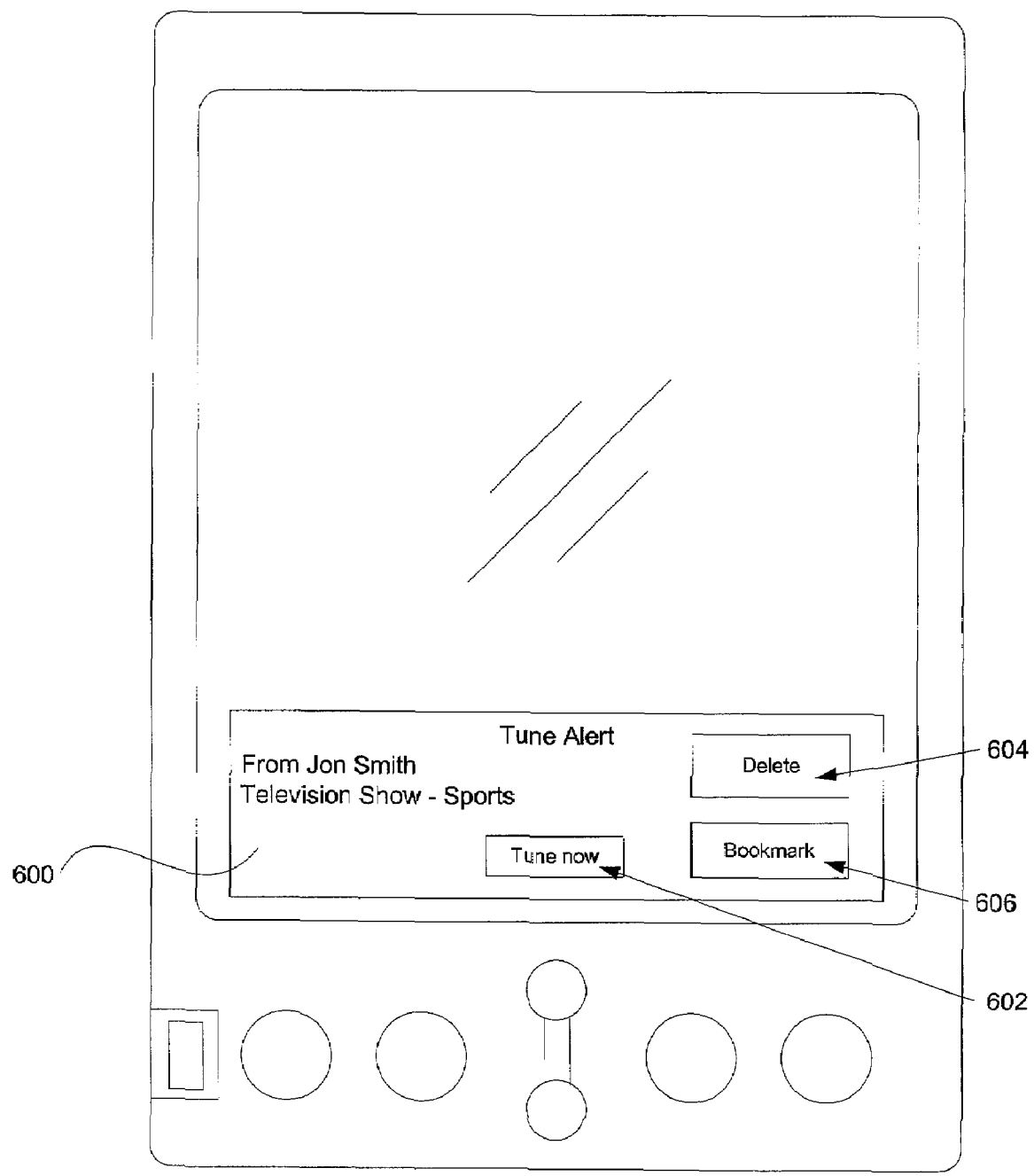
FIG. 6 shows a tune alert message displayed on a display screen of a portable audio/video device, in accordance with an embodiment of the invention.

FIG. 6 illustrates a tune alert message 600 displayed and a screen of a portable audio/visual device. Tune alert message 600 includes information identifying the source of the message and the type of content being broadcasted. Tune alert message 600 also includes buttons allowing the second user to decide how to respond to the message. A tune now button 602 may be selected to tune to the broadcast identified in the message. After the user selects tune now button 602, in step 312 the second media player is reconfigured to process the content identified in tune alert message 600. In one aspect of the invention, the second media player may be configured to automatically tune to broadcasts identified in tune alert messages without any further action by the user of the second media player. This feature may be set by making an appropriate preference selection.

A delete button 604 may be selected to delete the tune alert message. A bookmark button 606 may be included to bookmark the source of the content. In one aspect of the invention, tune alert message 600 is displayed for a predetermined period of time and then erased from the display screen.

The present invention is not limited to embodiments that include communication between two mobile terminals. In one embodiment of the invention (not shown), a media player may poll for tune alert messages either in response to a manual request from a user or in accordance with a rule set by the user. A media player may send preference information to a central server. The central server may store tune alert messages with corresponding metadata that may be matched to the preference information. When a match is found, the central server may then send one or more tune alert messages to the requesting media player. In a similar alternative embodiments, tune alert messages may be requested from other entities, such as a group of peers with matching taste in content, a particular broadcaster or a local Bluetooth or WLAN device, such as a media player using Bluetooth to broadcast a tune alert message. Among other advantages, requesting tune alert messages empowers users to find content at a particular time which best suits his or her preference for receiving and optionally consuming the content.

While the invention has been described with respect to specific examples, those skilled in the art will appreciate that there are numerous variations and permutations of the above described systems and techniques that fall within the spirit and scope of the invention as set forth in the appended claims. For example, the disclosed methods may be implemented as computer-executable instructions recorded on a computer readable medium such as a floppy disk or CD-ROM or as specified hardware, such as an ASIC or FPGA.

We claim:

1. A method of transmitting an alert message from a first mobile wireless device to a second mobile wireless device, the first mobile wireless device comprising a first media player and the second mobile wireless device comprising a second media player, the method comprising:
   (a) presenting broadcast content to a first user of the first media player;
   (b) generating at the first media player the alert message formatted to reconfigure the second media player to provide the broadcast content to a second user of the second media player; and
   (c) transmitting the alert message from the first media player to the second media player to provide the broadcast content to the second user of the second media player.

2. The method of claim 1, wherein the tune alert message comprises at least one content selection configuration parameter of the first media player.

3. The method of claim 1, wherein the content comprises audio content received from a radio broadcast source.

4. The method of claim 1, wherein the content comprises audio-visual content received from a video broadcast source.

5. The method of claim 1, wherein the tune alert message comprises an identification of a content source.

6. The method of claim 5, wherein the tune alert message further comprises profile information to characterize the broadcast content.

7. The method of claim 1, wherein (c) comprises transmitting the tune alert message from the first media player to a message server.

8. The method of claim 1, further comprising:
   (d) receiving, from another mobile wireless device, a received alert message that contains at least one broadcast parameter, the at least one broadcast parameter specifying a source of another broadcast content; and
   (e) tuning the first media player to the source of the other broadcast content in accordance with the at least one broadcast parameter.

9. The method of claim 1, wherein the broadcast content is received over a first communications channel and wherein the alert message is transmitted over a second communications channel.

10. A method of adjusting a configuration of a mobile wireless device to receive broadcast content, the mobile wireless device comprising a media player, the method comprising:
    (a) receiving at the media player an alert message formatted to reconfigure the media player to provide the broadcast content to a user of the media player;
    (b) presenting the alert message to the user of the media player; and
    (c) reconfiguring the media player to process the broadcast content.

11. The method of claim 10, further including: after (b) receiving an input from the user accepting or denying the tune alert message; and wherein (c) comprises reconfiguring the media player to process the broadcast content only when the user accepts the tune alert message.

12. The method of claim 10, wherein the tune alert message comprises configuration parameters of another media player.

13. The method of claim 10, wherein the content comprises audio content received from a radio broadcast source.

14. The method of claim 10, wherein the content comprises audio-visual content received from a video broadcast source.

15. The method of claim 10, wherein the tune alert message comprises an identification of a content source.

16. The method of claim 10, further including before (b):
    comparing at least one parameter of the tune alert message to at least one preference parameter provided by a user of the media player.

17. The method of claim 10, wherein the broadcast content comprises promotional content.

18. The method of claim 10, wherein the alert message contains at least one broadcast parameter that specifies a source of the broadcast content, and wherein (c) comprises:
    (i) tuning the media player to the source of the broadcast content in accordance with the at least one broadcast parameter.

19. The method of claim 18, wherein the alert message includes an action option parameter, and wherein (i) comprises:
(1) if the media player receives a user input in concert with the action option parameter, tuning the media player to the broadcast source.

20. The method of claim 18, wherein the media player automatically tunes to the broadcast source.

21. The method of claim 10, wherein the broadcast content is received over a first communications channel and wherein the alert message is received over a second communications channel.

22. A mobile wireless device configured to receive messages and broadcast content, the mobile wireless device comprising:
a media player comprising:
a communication module that receives a message identifying a source of broadcast content;
a tuner that is adjustable to process content received from a plurality of different sources of broadcast content; and
an alert module configured to adjust the tuner to process content received from the source of the broadcast content identified in the message.

23. The receiver of claim 22, wherein the tuner processes radio content.

24. The receiver of claim 22, wherein the tuner processes video content.

25. The receiver of claim 22, wherein the tuner process multimedia content.

26. A computer-readable medium containing computer-executable instructions for causing a first mobile wireless device comprising a first media player to perform the steps comprising:
(a) presenting broadcast content to a first user of the first media player;
(b) generating at the first media player an alert message that may be used to reconfigure a second media player to provide the broadcast content to a second user of the second media player; and
(c) transmitting the alert message from the first media player to the second media player to provide the broadcast content to the second user of the second media player.

27. The computer-readable medium of claim 26, wherein the computer-executable instructions cause the first wireless device to perform the steps comprising:
(d) receiving, from another mobile wireless device, a received alert message that contains at least one broadcast parameter, the at least one broadcast parameter specifying a source of another broadcast content; and
(e) tuning the first media player to the source of the other broadcast content in accordance with the at least one broadcast parameter.

28. A mobile wireless device comprising:
a media player comprising:
a means for selecting content to present to a user; and
a means for transmitting tuning information that corresponds to the content and is formatted to be used to tune a remote device.

29. The mobile wireless device of claim 28, wherein the media player further comprises:
a means for receiving received tuning information from another mobile wireless device, the received tuning information corresponding to another broadcast content; and
a means for tuning to a source of the other broadcast content in accordance with the received tuning information.

30. A mobile terminal comprising:
a transceiver module that sends and receives messages;
a tuner module configurable to select broadcast content;
a tune alert module coupled to the tuner module and the transceiver module, the tune alert module generating tune alert messages that are formatted to adjust a tuner module of another mobile terminal; and
an audio/video generation module for receiving the broadcast content from the tuner and providing audio and video signals to output devices.

31. A system for transmitting an alert message, the system comprising:
(a) a first mobile wireless device comprising a media player, the media player configured to receive broadcast content to a first user and having a tune alert module to generate an alert message formatted to reconfigure a second mobile wireless device to provide the broadcast content to a second user of the second mobile device; and
(b) a second mobile device comprising a media player, wherein media player of the second mobile device comprises an alert module configured to process the broadcast content received from the first mobile wireless device upon receiving the alert message.

32. A computer-readable medium containing computer-executable instructions for causing a first mobile wireless device receive messages and broadcast content, the instructions performing the steps of:
(a) causing a communication module to receive at least one message identifying a source of broadcast content;
(b) processing at an adjustable tuner the content received from a plurality of different sources of broadcast content; and
(c) adjusting the tuner to process content received from the source of the broadcast content identified in the message.

* * * * *